UNITED STATES PATENT OFFICE.

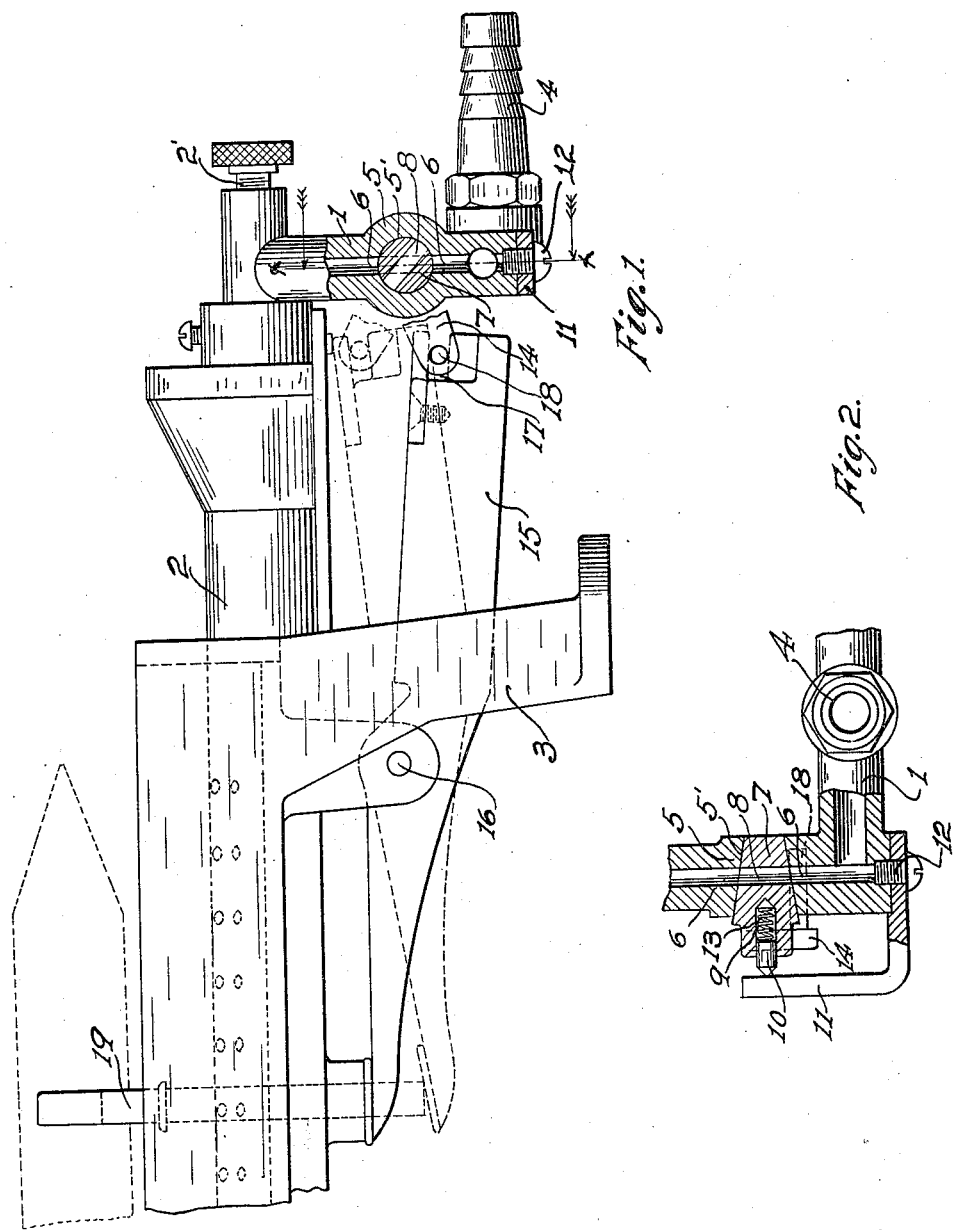

PAUL R. FLAMM, OF NORTH CHICAGO, ILLINOIS.

VALVE FOR SOLDERING-IRON FURNACES.

1,174,929.  Specification of Letters Patent.  Patented Mar. 7, 1916.

Application filed April 24, 1912, Serial No. 692,915. Renewed October 23, 1915. Serial No. 57,593.

*To all whom it may concern:*

Be it known that I, PAUL R. FLAMM, a citizen of the United States, and a resident of the city of North Chicago, county of Lake, and State of Illinois, have invented certain new and useful Improvements in Valves for Soldering-Iron Furnaces, of which the following is a specification.

My invention relates to soldering iron furnaces and more specifically to valves therefor for governing the supply of fuel to the furnace burner.

The object of my invention is the production of a valve of the character mentioned which will be of simple and economical construction and efficient in operation.

Other objects will appear hereinafter.

The invention consists in the combinations and arrangements of parts hereinafter described and claimed.

The invention will be best understood by reference to the accompanying drawing forming a part of this specification, and in which—

Figure 1 is a fragmentary sectional side elevation of a soldering iron furnace, which is equipped with a valve embodying my invention, and Fig. 2 is a transverse section taken on substantially line *x—x* of Fig. 1.

The preferred form of construction as illustrated in the drawing comprises a valve which is interposed in the supply pipe 1 of the furnace, said pipe communicating at one end with the furnace burner 2, which is mounted in the supporting frame 3 of the furnace, the opposite end of the supply pipe being provided with a nipple 4 for connection of the usual flexible hose therewith. The valve in question is designed simply to govern the passage through pipe 1, that is to completely open or completely close the same, the regulation of the flow of fuel through said pipe to the burner being effected by a needle valve 2'.

The valve in question comprises a casing 5 which is formed in pipe 1, said casing being provided with a tapering socket 5' having diametric ports 6 which are simply the terminals of the interrupted fuel passage through the pipe 1. Snugly fitting the socket 5' is a valve plug 7 of corresponding form, said valve plug being provided with a transverse passage 8 adapted for registration with the ports 6 as will be readily understood, and as clearly shown in Fig. 2. Provided in the larger end of the plug 7 is an axial recess 9 in the outer end of which is slidably mounted a spindle 10. The spindle 10 is provided with a tapering pointed outer end which engages against a stationary angular stop 11 which is secured in position by means of screw 12, removal of said spindle from the recess 9 or of the valve plug 7 from its socket, being permitted upon detachment of said stop, as will be readily understood. Arranged in the bottom of the recess 9 behind the spindle 10 is a helical compression spring 13, said spring effecting the forcing of said spindle against the stop 11 and the seating of the plug 7 in its socket. Said spring is always in slight compression so that the same will be adapted to constantly maintain the valve plug seated, any wear upon said valve plug or upon the spindle being taken up by said spring. By reason of the tapering pointed construction of the engaging end of the spindle, the friction incident to the contact thereof with the stop 11 is reduced to a minimum thereby conducing to free and easy operation of the valve plug.

Said valve is oscillated through the medium of a rocker arm 14 which projects from the outer end thereof. Said arm 14 is operated through the medium of a lever 15 which is fulcrumed in the frame 3 at 16, the bifurcated end 17 of lever 15 engaging a pin 18 which is carried at the outer end of arm 14. With this arrangement it will be seen, that oscillation of the lever 15 effects simultaneous movement of the arm 14 and hence oscillation of the valve plug 7 to effect registration or non-registration of the passage 8 with the ports 6. The lever 15 is so balanced that the same will be adapted to normally hold the valve plug 7 in closing position, oscillation of said lever in order to oscillate said valve plug to open position being effected by a vertically movable tool rest 19 which is mounted in the frame 3 in close proximity with the burner 2. Through the medium of the rest 19, when a tool is arranged upon the upper end of said rest, the latter, by reason of the weight of the tool, will be moved downwardly in order to rock the lever 15 to move the valve plug 7 to open position, as shown in dotted lines in Fig. 1. When the tool is removed from the rest 19, the lever 15, by virtue of its own weight, will rock to the normal position shown in full lines in Fig. 1 to move the valve plug to closing position.

A valve of the construction set forth is simple and economical of construction, hence may be manufactured at a low cost, and is not so susceptible to readily becoming inoperative.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the kind described the combination of a casing having a tapering valve seat therein; a rotary valve plug fitted in said valve seat and coöperating therewith, said valve plug being provided with a longitudinally extending recess in its larger end; a spring pressed pointed spindle mounted in said recess; an arm carried by said casing and engaging the point of said spindle; and an operating lever carried by said valve plug, substantially as described.

2. In a device of the class described, a valve casing having a conical valve seat therein, a conical valve plug fitted within said seat and provided with a longitudinally extending recess in its larger end, a spindle fitting snugly within the outer end of said recess and provided with a pointed outer end, a spring in said recess impinging against the inner end of said spindle and an arm rigidly connected to the casing and engaging the pointed end of said spindle, substantially as described.

In testimony whereof I have signed my name to this specification in the presence of two subscribing witnesses.

PAUL R. FLAMM.

Witnesses:
JOSHUA R. H. POTTS,
ARTHUR A. OLSON.

Copies of this patent may be obtained for five cents each, by addressing the "Commissioner of Patents. Washington, D. C."